(12) United States Patent
Cho et al.

(10) Patent No.: US 9,350,168 B2
(45) Date of Patent: May 24, 2016

(54) VOLTAGE EQUALIZATION APPARATUS FOR CONNECTING POWER STORAGE UNIT RACKS AND POWER STORAGE SYSTEM INCLUDING THE SAME

(71) Applicant: LG CHEM, LTD., Seoul (KR)

(72) Inventors: Young-Bo Cho, Daejeon (KR); Chan-Min Park, Daejeon (KR); Jung-Soo Kang, Daejeon (KR); Jong-Soo Ha, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/092,392

(22) Filed: Nov. 27, 2013

(65) Prior Publication Data
US 2014/0084690 A1    Mar. 27, 2014

Related U.S. Application Data

(63) Continuation of application No. PCT/KR2012/004329, filed on May 31, 2012.

(30) Foreign Application Priority Data

May 31, 2011  (KR) .................. 10-2011-0051805
May 31, 2012  (KR) .................. 10-2012-0058890

(51) Int. Cl.
*H02J 1/00* (2006.01)
*H01M 10/42* (2006.01)
(Continued)

(52) U.S. Cl.
CPC .............. *H02J 1/00* (2013.01); *H01M 10/425* (2013.01); *H01M 10/441* (2013.01); *H01M 10/482* (2013.01); *H02J 7/0016* (2013.01); *H01M 2010/4271* (2013.01); *Y10T 307/50* (2015.04)

(58) Field of Classification Search
CPC ..... H02J 7/0014; H02J 7/0018; H02J 7/0019; H02J 1/00
USPC ......................................................... 307/102
See application file for complete search history.

(56) References Cited

U.S. PATENT DOCUMENTS 5,150,033 A *  9/1992  Conway ......................... 320/112
5,432,455 A *  7/1995  Blades ........................... 324/536
(Continued)

FOREIGN PATENT DOCUMENTS

JP      11-164482 A      6/1999
JP     2000-116014 A    4/2000
(Continued)

OTHER PUBLICATIONS

International Search Report issued in PCT/KR2012/004329, mailed on Nov. 28, 2012.
(Continued)

*Primary Examiner* — Daniel Cavallari
(74) *Attorney, Agent, or Firm* — Birch, Stewart, Kolasch & Birch, LLP

(57) ABSTRACT

The present disclosure describes a voltage equalization apparatus for equalizing voltages of adjacent power storage unit racks included in a power storage system. The voltage equalization apparatus according to the present disclosure includes a resistor to which a current flowing from a high-voltage unit rack to a low-voltage unit rack is applied; and a circuit breaker for voltage equalization installed on a line through which the current flows.

3 Claims, 2 Drawing Sheets

(51) Int. Cl.
*H01M 10/44* (2006.01)
*H01M 10/48* (2006.01)
*H02J 7/00* (2006.01)

(56) References Cited

U.S. PATENT DOCUMENTS

| | | | |
|---|---|---|---|
| 7,592,773 | B2 | 9/2009 | Pellenc |
| 8,089,247 | B2 | 1/2012 | Pellenc |
| 8,425,267 | B2 | 4/2013 | Harpin et al. |
| 8,593,015 | B2 * | 11/2013 | Gottlieb ............... H02J 1/10 307/87 |
| 2001/0054877 | A1 | 12/2001 | Kinoshita |
| 2004/0035807 | A1 | 2/2004 | Marraffa |
| 2004/0079714 | A1 * | 4/2004 | Andrew et al. ............. 211/49.1 |
| 2005/0121979 | A1 | 6/2005 | Matsumoto et al. |
| 2007/0285058 | A1 | 12/2007 | Kuroda |
| 2008/0258683 | A1 | 10/2008 | Chang |
| 2011/0003182 | A1 | 1/2011 | Zhu |
| 2011/0074354 | A1 * | 3/2011 | Yano .................. H01M 10/441 320/116 |
| 2011/0127964 | A1 * | 6/2011 | Nishida et al. ............... 320/118 |
| 2011/0279085 | A1 | 11/2011 | Shigemizu et al. |

FOREIGN PATENT DOCUMENTS

| | | |
|---|---|---|
| JP | 2000-139041 A | 5/2000 |
| JP | 2002-10501 A | 1/2002 |
| JP | 2002-142383 A | 5/2002 |
| JP | 2005-176461 A | 6/2005 |
| JP | 2006-67683 A | 3/2006 |
| JP | 2007-511380 A | 5/2007 |
| JP | 2009-81078 A | 4/2009 |
| JP | 2010045923 A * | 2/2010 |
| JP | 2010-141970 A | 6/2010 |
| JP | 2010-528576 A | 8/2010 |
| KR | 10-2011-0028343 A | 3/2011 |
| WO | WO 2011/149594 A1 | 12/2011 |

OTHER PUBLICATIONS

Written Opinion issued in PCT/KR2012/004329, mailed on Nov. 28, 2012.

* cited by examiner

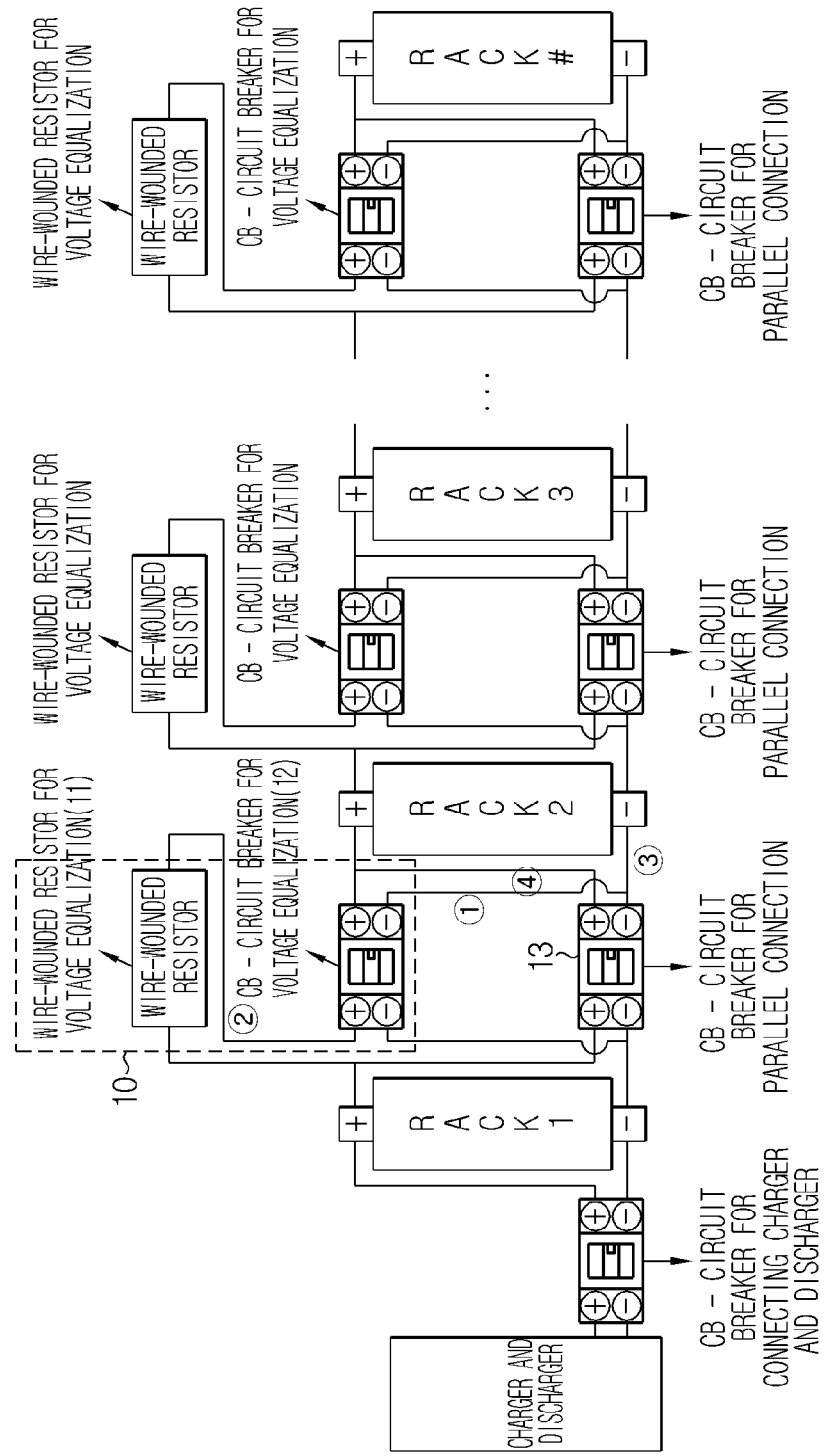

VOLTAGE EQUALIZATION APPARATUS FOR CONNECTING POWER STORAGE UNIT RACKS AND POWER STORAGE SYSTEM INCLUDING THE SAME

CROSS-REFERENCE TO RELATED APPLICATION

The present application is a continuation of International Application No. PCT/KR2012/004329 filed on May 31, 2012, which claims priority to Korean Patent Application No. 10-2011-0051805 filed in the Republic of Korea on May 31, 2011 and to Korean Patent Application No. 10-2012-0058890 filed in the Republic of Korea on May 31, 2012, the disclosures of which are incorporated herein by reference.

TECHNICAL FIELD

The present disclosure relates to a voltage equalization apparatus, and more particularly, to an apparatus for equalizing voltages of power storage unit racks when configuring a large capacity power storage apparatus by connecting a plurality of power storage unit racks to each other.

BACKGROUND ART

A power storage system is often configured by connecting small capacity unit racks in parallel to meet the capacity requirement. A voltage deviation is shown between the unit racks intended to connect in parallel, a voltage equalization process is generally performed by using an external charger and discharger. However, it has a problem in that, when an external charger and discharger is not available at a site, unit racks using different voltages may not be connected in parallel.

DISCLOSURE

Technical Problem

The present disclosure is designed to solve the problems of the prior art, and therefore it is an object of the present disclosure to provide a voltage equalization apparatus, which may equalize voltages of power storage unit racks without using an external charger and discharger when the unit racks are connected in parallel, and a power system including the same.

Technical Solution

In order to accomplish the above object, the present disclosure provides a voltage equalization apparatus connected in parallel to a power line between adjacent power storage unit racks, including a resistor to which a current flowing from a high-voltage unit rack to a low-voltage unit rack is applied and a circuit breaker for voltage equalization installed on a line through which the current flows.

Preferably, the resistor is a high power wire-wounded resistor.

According to the present disclosure, the voltage equalization apparatus may be permanently combined with a power storage unit rack or optionally connected therewith when a large capacity power storage system is configured by connecting power storage unit racks in series or in parallel or during maintenance of the large capacity power storage system. The power storage unit rack includes a housing made of metal or plastic and a plurality of cell modules accommodated in the housing and connected in series or in parallel.

In order to accomplish the above object, the present disclosure provides a power storage system including a plurality of power storage unit racks electrically connected to each other and a voltage equalization apparatus, connected in parallel to a power line between adjacent power storage unit racks, including a resistor to which a current flowing from a high-voltage unit rack to a low-voltage unit rack is applied and a breaker installed on the line through which the current flows.

Preferably, the power storage system may further include a circuit breaker installed on a power line, which connects adjacent power storage racks.

According to an aspect of the present disclosure, the circuit breaker may include a fuse. Herein, the fuse irreversibly disconnects a power line, on which the circuit breaker is installed, when an over-current flows.

According to another aspect of the present disclosure, the circuit breaker may include a mechanical relay for dissociating a contact point by a magnetic force, when an over-current flows. That is, when an over-current flows, the circuit breaker instantaneously dissociates a contact point of a mechanical relay thereof to disconnect a power line, on which the circuit breaker is installed.

According to the present disclosure, the voltage equalization apparatus may further include a control unit capable of controlling voltage equalization of power storage unit racks. The control unit may start a voltage equalization process if a voltage deviation is equal to or greater than a critical value set in advance. Meanwhile, the control unit may end a voltage equalization process if a voltage deviation is equal to or smaller than a target value set in advance.

According to still another aspect of the present disclosure, the circuit breaker may include an electric relay for dissociating a contact point by a control signal. In this case, when a control signal is input from the control unit, the circuit breaker may operate to turn off the electric relay.

Accordingly, the circuit breaker is preferably connected to the control unit. The control unit allows the electric relay included in the circuit breaker to turn off by sensing a current value with a current sensor installed on the power line and applying a control signal to the circuit breaker when the sensed current value is equal to or greater than a critical value. Therefore, the control unit may disconnect a power line on which the circuit breaker is installed.

A large capacity power storage system may be implemented by arranging the power storage unit racks according to the present disclosure as described above with regular numbers, and then, connecting the power storage unit racks to each other in series or in parallel.

Advantageous Effects

According to the present disclosure, since it is unnecessary to use an external charger and discharger for equalizing voltages of power storage unit racks before the unit racks are connected to each other, a large capacity power storage system may be configured by connecting the unit racks to each other at a site where an external charger and discharger is absent. Also, by using a high power wire-wounded resistor, voltage equalization may be rapidly performed between adjacent power storage unit racks.

DESCRIPTION OF DRAWINGS

The accompanying drawing, which is incorporated in and constitute a part of the specification, illustrates an embodiment of the disclosure and, together with the description, serve to explain the principles of the drawing:

FIG. 2 is a schematic diagram showing a power storage system including a voltage equalization apparatus installed between adjacent power storage unit racks according to another embodiment of the present disclosure.

BEST MODE

Figure 1:
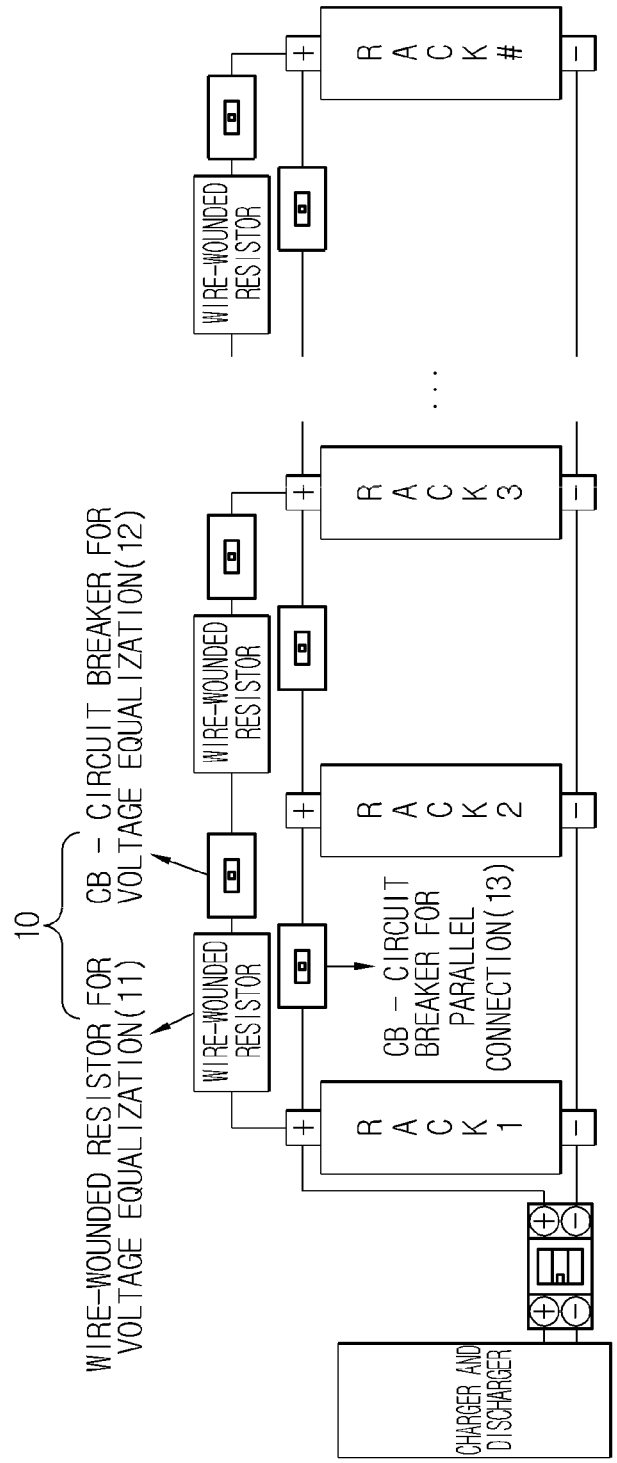
FIG. 1 is a schematic diagram showing a power storage system including a voltage equalization apparatus installed between adjacent power storage unit racks according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a schematic diagram showing a power storage system including a voltage equalization apparatus installed between adjacent power storage unit racks according to an embodiment of the present disclosure.

Referring to FIG. 1, a large capacity power storage system is configured by connecting a plurality of power storage racks in parallel. In FIG. 1, a line connected to a (+) terminal represents a high potential power line and a line connected to a (−) terminal represents a low potential power line.

The power storage unit rack includes a housing made of metal or plastic and a plurality of cell modules connected in series or in parallel which is accommodated in the housing.

Each power storage unit rack includes a high potential terminal (+) and a low potential terminal (−).

When the plurality of cell modules included in the unit rack are connected in series, the high potential terminal (+) of the unit rack accesses the uppermost potential terminal among the terminals of the cell modules included in the unit rack, and the low potential terminal (−) of the unit rack accesses the undermost potential terminal among the terminals included in the unit rack.

Also, when the plurality of cell modules included in the unit rack are connected in parallel, the high potential terminal (+) of the unit rack accesses the high potential terminals of the outermost cell modules among the cell modules included in the unit rack, and the low potential terminal (−) of the unit rack accesses the low potential terminals of the outermost cell modules included in the unit rack.

Referring to FIG. 1, since terminals having the same polarity are connected, the power storage unit racks are connected in parallel. However, the power storage unit racks may also be connected in series, as being obvious in the art.

The voltage equalization apparatus 10 according to the present disclosure is connected to electrode terminals having the same polarity between adjacent power storage unit racks. That is, the adjacent power storage unit racks are connected in parallel. Although FIG. 1 shows an embodiment in which the voltage equalization apparatus 10 is connected to a high potential terminal, the voltage equalization apparatus 10 may also be connected to a low potential terminal. Also, the voltage equalization apparatus 10 includes a resistor 11 to which a current flowing from a high-voltage unit rack to a low-voltage unit rack is applied and a circuit breaker 12 for voltage equalization installed on a line through which the current flows.

Preferably, the resistor 11 is a high power wire-wounded resistor. When a high power wire-wounded resistor is used as the resistor 11, a resistance value is small and a maximum current is large, thereby making it possible to rapidly perform the voltage equalization of unit racks.

The voltage equalization apparatus 10 may be permanently combined with the power storage unit rack, or optionally connected between adjacent power storage unit racks when a large capacity power storage system is configured by connecting power storage unit racks in series or in parallel or during maintenance of the large capacity power storage system.

According to an aspect of the present disclosure, the circuit breaker 12 for voltage equalization may include a fuse. In this case, the circuit breaker 12 for voltage equalization irreversibly disconnects a power line on which the circuit breaker is installed, when an over-current flows.

According to another aspect of the present disclosure, the circuit breaker 12 for voltage equalization may include a mechanical relay for dissociating a contact point by a magnetic force, when an over-current flows. In this case, when an over-current flows, the circuit breaker 12 for voltage equalization instantaneously dissociates a contact point of the mechanical relay included therein to disconnect a power line on which the circuit breaker is installed.

The voltage equalization apparatus 10 according to the present disclosure may further include a control unit capable of controlling voltage equalization of the power storage unit racks.

The control unit may start voltage equalization for the power storage unit racks, when a voltage deviation of power storage unit racks is equal to or greater than a critical value set in advance. For this, the control unit may include a voltage measuring unit for measuring a voltage of each power storage unit rack. The control unit monitors a voltage value for each power storage unit rack measured by using the voltage measuring unit. At this time, if a deviation of the measured voltage values for the power storage unit racks is equal to or greater than a critical value, the circuit breaker 12 for voltage equalization and a circuit breaker 13 for parallel connection are controlled to overcome the voltage deviation of the unit racks as described above.

The critical value may be set in advance and stored in a memory device connected to the control unit. The critical value may be variously set depending on charge-discharge capacity, output power, an environment where the power storage unit racks are used, or the like.

In addition, the control unit may monitor a voltage value of each power storage unit rack in real time or periodically at regular time intervals or at charge and discharge intervals.

Meanwhile, after a voltage equalization process has started for the power storage unit racks by the control unit, if a voltage deviation of power storage unit racks is equal to or smaller than a target value set in advance, the control unit may end the voltage equalization process for the power storage unit racks. After the voltage equalization process for the power storage unit racks has started by the control unit, the control unit monitors voltages of the power storage unit racks connected to the voltage equalization apparatus 10. Then, when a voltage deviation of the power storage unit racks which are connected to the voltage equalization apparatus 10 is equal to or smaller than the target value set in advance, the voltage equalization process may end by controlling the circuit breaker 12 for voltage equalization and a circuit breaker 13 for parallel connection as described above.

The target value may be set in advance and stored in a memory device which is connected to the control unit. The target value may be variously set depending on charge-discharge capacity, output power, an environment where the power storage unit racks are used, or the like. Also, the target value may be the same as the above-mentioned critical value.

In addition, after the voltage equalization process has started, the control unit may monitor a voltage value of each power storage unit rack in real time, or periodically at regular time intervals or at charge and discharge intervals.

According to still another aspect of the present disclosure, the circuit breaker 12 for voltage equalization may include an electric relay for dissociating a contact point by a control signal. In this case, when a control signal is inputted from the control unit, the circuit breaker 12 for voltage equalization may turn off the electric relay.

To achieve this, it is preferred that the circuit breaker 12 for voltage equalization be connected to the control unit. The control unit turns off the electric relay included in the circuit breaker by sensing a current value with a current sensor installed on a power line connected to the circuit breaker 12 for voltage equalization and then applying a control signal to the circuit breaker 12 for voltage equalization when the sensed current value is equal to or greater than a critical value, thereby disconnecting the power line.

The circuit breaker 12 for voltage equalization is turned on when the voltage equalization process of the unit racks is performed. The circuit breaker 12 for voltage equalization is turned on by a worker manually or by applying a turn-on signal thereto through the control unit. When the circuit breaker 12 for voltage equalization is turned on, a current automatically flows from a high-voltage unit rack to a low-voltage unit rack through the resistor 11, and during this process, voltage equalization is rapidly performed.

Meanwhile, the circuit breaker 13 for parallel connection may be installed on a power line which connects adjacent power storage unit racks. While the voltage equalization apparatus 10 is operating, the circuit breaker 13 for parallel connection keeps a turn-off state and the circuit breaker 12 for voltage equalization is turned on. The circuit breakers 12, 13 may be operated by a worker manually or by applying a control signal thereto through the control unit.

Meanwhile, when the voltage equalization is completed between adjacent unit racks, the circuit breaker 13 for parallel connection is turned on. The circuit breaker 13 for parallel connection is turned on by a worker manually or by applying a control signal thereto through the control unit. At this time, the circuit breaker 12 for voltage equalization may be either turned on or off. Preferably, the circuit breaker 12 for voltage equalization is turned off.

The circuit breaker 13 for parallel connection optionally makes or breaks the parallel connection of adjacent unit racks. Also, the circuit breaker 13 disconnects a line which connects adjacent unit racks in parallel, when an over-current flows on the line. Even though, it is illustrated that the circuit breaker 13 for parallel connection is installed on a high potential line, the circuit breaker 13 for parallel connection may also be installed on a low potential line, without being limited thereto. The circuit breaker 13 for parallel connection may be turned on or off by a worker manually or by applying a control signal from the control unit thereto. The circuit breaker 13 for parallel connection and the circuit breaker 12 for voltage equalization may be configured with the same kind of breakers, and the operation mechanisms of the circuit breakers 12, 13 when an over-current flows on a power line are substantially the same.

Meanwhile, a large capacity power storage system configured by connecting power storage unit racks in parallel may connect to a charger and discharger 14. When the power storage system is in a charging mode, the charger and discharger 14 converts an alternating current (AC) to a direct current (DC) and applies the converted current to the power storage system. Conversely, when the power storage system is in a discharging mode, the charger and discharger 14 converts a DC current which is outputted from the power storage system to an AC current which is required in a power network system and then applies the converted current to the power network system. The charger and discharger 14 may be substituted with a power inverter, but the present disclosure is not specially limited to the kinds of hardware for connecting a power storage system to a power network system.

FIG. 2 is a schematic diagram showing a power storage system including a voltage equalization apparatus installed between adjacent power storage unit racks according to another embodiment of the present disclosure.

Referring to FIG. 2, the configuration of the power storage system of FIG. 2 is substantially the same as that shown in FIG. 1, except that the circuit breaker 12 for voltage equalization and the circuit breaker 13 for parallel connection are connected to a high potential power line and a low potential power line at the same time. In FIG. 2, a red line represents a high potential power line and a black line represents a low potential power line. Hereinafter, the power storage systems of this embodiment will be described based on configurations different from those of the former embodiment.

When the voltage equalization apparatus 10 starts operating, the circuit breaker 13 for parallel connection keeps a turn-off state and the circuit breaker 12 for voltage equalization is turned on. The circuit breakers 12, 13 may be controlled by a worker manually or by applying a control signal thereto with the control unit.

If the circuit breakers 12, 13 are controlled as described above, adjacent unit racks are connected in parallel through number ① and number ② power lines. This leads a current to flow from high voltage unit racks to low voltage unit racks. Therefore voltage equalization is rapidly performed.

Meanwhile, when the voltage equalization is completed between the adjacent unit racks, the circuit breaker 13 for parallel connection is turned on. The circuit breaker 13 for parallel connection is turned on by a worker manually or by applying a control signal thereto through the control unit. At this time, the circuit breaker 12 for voltage equalization may be either turned on or off. More preferably, the circuit breaker 12 for voltage equalization is turned off. If the circuit breakers 12, 13 are controlled as described above, adjacent unit racks are connected in parallel through number ③ and number ④ power lines.

In order to optionally connect numbers ① to ④ power lines by operating the circuit breakers 12, 13, the circuit breakers 12, 13 may have a contact point for connecting or disconnecting two different power lines. In this case, the circuit breakers 12, 13 may disconnect a power line system (e.g., ③ and ④ power lines) while connecting another power line system (e.g., ① and ② power lines), or vice versa.

The voltage equalization apparatus 10 may be permanently combined with power storage unit racks, or optionally connected between adjacent power storage unit racks when a large capacity power storage system is configured by connecting power storage unit racks in series or in parallel or during maintenance of the large capacity power storage system.

Hereinafter, a method for controlling a voltage equalization apparatus which corresponds to the operation mechanism of the voltage equalization apparatus 10 will be described. However, the configuration of the voltage equalization apparatus 10, which has been already described above, will not be explained again.

First, the control unit monitors a voltage value for each power storage unit rack. If a voltage deviation of power storage unit racks is equal to or greater than a critical value set in advance, the control unit outputs a control signal to the circuit breaker 12 for voltage equalization and the circuit breaker 13 for parallel connection.

Then, according to the control signal of the control unit, the voltage equalization apparatus 10 is connected between electrodes having the same polarity of a power storage unit rack demanding voltage equalization. At this time, the voltage equalization apparatus 10 may be connected to a high potential terminal or a low potential terminal of the power storage unit rack.

The control unit outputs control signals to turn off the circuit breaker 13 for parallel connection and turn on the circuit breaker 12 for voltage equalization. According to the method for controlling a voltage equalization apparatus of the present disclosure, turning off the circuit breaker 13 for parallel connection and turning on the circuit breaker 12 for voltage equalization may be performed at different times or at the same time. Also, after the circuit breaker 12 for voltage equalization is turned on, the circuit breaker 13 for parallel connection may be turned off.

Next, the control unit monitors whether a voltage deviation of the power storage unit racks connected to the voltage equalization apparatus 10 is equal to or smaller than a target value set in advance or not. If the voltage deviation is equal to or smaller than the target value set in advance, the control unit determines that the voltages of the power storage unit racks connected to the voltage equalization apparatus 10 are equalized.

Then, the control unit outputs control signals allowing the circuit breaker 12 for voltage equalization to be turned off and the circuit breaker 13 for parallel connection to be turned on. In this step, turning off the circuit breaker 13 for parallel connection and turning on the circuit breaker 12 for voltage equalization may also be performed at different times or at the same time, or in an inverted order.

According to the present disclosure as described above, since it is unnecessary to use an external charger and discharger for equalizing voltages of power storage unit racks before the unit racks are connected to each other, a large capacity power storage system may be configured by connecting the unit racks to each other at a site where an external charger and discharger is absent. Also, by using a high power wire-wounded resistor, voltage equalization process may be rapidly performed between adjacent power storage unit racks.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A power storage system, comprising:
    a plurality of battery racks;
    a voltage equalization apparatus including a resistor electrically connected between two adjacent battery racks and a voltage equalization circuit breaker, the voltage equalization circuit breaker connected in series to the resistor to selectively turn on or off and provided to disconnect a line on which the voltage equalization circuit breaker is installed; and
    a parallel circuit breaker installed on a power line connecting the two adjacent battery racks to selectively turn on or off and provided to disconnect the power line,
    wherein the power line is connected to the line, on which the resistor and the voltage equalization circuit breaker are installed, in parallel,
    wherein when turning on, the voltage equalization circuit breaker allows a current to flow through the resistor so that voltages of the adjacent battery racks are equalized,
    wherein both the series connected resistor and the voltage equalization circuit breaker are directly electrically connected between positive terminals of corresponding first and second battery racks, which are the two adjacent battery racks, and
    wherein the parallel circuit breaker is directly electrically connected between negative terminals of the corresponding first and second battery racks.

2. The power storage system according to claim 1, wherein the resistor is a high power wire wounded resistor.

3. The power storage system according to claim 1, further comprising:
    a control unit configured to control the voltage equalization circuit breaker and the parallel circuit breaker,
    wherein the control unit outputs a turn-off signal to the parallel circuit breaker and outputs a turn-on signal to the voltage equalization circuit breaker to perform voltage equalization, and
    wherein when the voltage equalization is performed, the control unit outputs a turn-on signal to the parallel circuit breaker and outputs a turn-off signal to the voltage equalization circuit breaker.

* * * * *